(12) United States Patent
Tompkin et al.

(10) Patent No.: US 8,387,886 B2
(45) Date of Patent: Mar. 5, 2013

(54) SECURITY DOCUMENT WITH ELECTRICALLY-CONTROLLED DISPLAY ELEMENT

(75) Inventors: Wayne Robert Tompkin, Baden (CH); Andreas Schilling, Hagendorn (CH); John Anthony Peters, Au (CH)

(73) Assignee: OVD Kinegram AG, Zug (CH)

( * ) Notice: Subject to any disclaimer, the term of this patent is extended or adjusted under 35 U.S.C. 154(b) by 984 days.

(21) Appl. No.: 11/575,240

(22) PCT Filed: Sep. 15, 2005

(86) PCT No.: PCT/EP2005/009920
§ 371 (c)(1),
(2), (4) Date: Jun. 21, 2007

(87) PCT Pub. No.: WO2006/029857
PCT Pub. Date: Mar. 23, 2006

(65) Prior Publication Data
US 2008/0035736 A1  Feb. 14, 2008

(30) Foreign Application Priority Data
Sep. 17, 2004  (DE) .......................... 10 2004 045 211

(51) Int. Cl.
*G06K 7/00* (2006.01)
*G03H 1/00* (2006.01)
*G03H 1/04* (2006.01)
*G02B 5/18* (2006.01)
*G03F 7/00* (2006.01)

(52) U.S. Cl. ................ 235/488; 359/2; 359/576; 430/1; 430/2; 283/72; 283/83

(58) Field of Classification Search .................. 235/487, 235/488, 492; 283/72, 83–89, 94; 430/1, 430/2; 359/1, 2, 15, 558, 566, 569, 572, 359/573, 576
See application file for complete search history.

(56) References Cited

U.S. PATENT DOCUMENTS

| 2,889,490 | A | * | 6/1959 | Paradise | ........................ 315/157 |
| 4,367,366 | A | * | 1/1983 | Bloss et al. | ................... 136/246 |
| 4,472,627 | A | | 9/1984 | Weinberger | |
| 4,889,366 | A | * | 12/1989 | Fabbiani | ........................ 283/86 |

(Continued)

FOREIGN PATENT DOCUMENTS

| DE | 19735293 | 2/1999 |
| DE | 19747613 | 5/1999 |

(Continued)

OTHER PUBLICATIONS

Specification and drawings of U.S. Appl. No. 10/066,495, filed 2002.*

(Continued)

*Primary Examiner* — Michael G Lee
*Assistant Examiner* — Suezu Ellis
(74) *Attorney, Agent, or Firm* — Hoffmann & Baron, LLP

(57) ABSTRACT

The invention concerns a security document comprising a flexible carrier and a multi-layer flexible film body which is applied to the flexible carrier and which provides one or more optical security features. The flexible multi-layer film body has an electrically controller display element for generating an optical security feature with associated electrical current source for operation of the display element in combination with an optically active diffractive structure.

20 Claims, 7 Drawing Sheets

U.S. PATENT DOCUMENTS

| | | | |
|---|---|---|---|
| 5,517,339 A * | 5/1996 | Riccobono et al. | 359/15 |
| 5,782,993 A * | 7/1998 | Ponewash | 136/251 |
| 5,882,463 A * | 3/1999 | Tompkin et al. | 156/234 |
| 6,046,543 A * | 4/2000 | Bulovic et al. | 313/504 |
| 6,104,812 A | 8/2000 | Koltai et al. | |
| 6,175,441 B1 | 1/2001 | Heuer et al. | |
| 6,340,496 B1 * | 1/2002 | Cloots et al. | 427/58 |
| 6,428,051 B1 * | 8/2002 | Herrmann et al. | 283/107 |
| 6,508,489 B2 | 1/2003 | Herrmann et al. | |
| 6,753,999 B2 * | 6/2004 | Zehner et al. | 359/296 |
| 6,886,864 B2 | 5/2005 | Nelson et al. | |
| 6,924,781 B1 * | 8/2005 | Gelbman | 345/85 |
| 7,090,139 B2 | 8/2006 | Kasuga et al. | |
| 7,140,550 B2 * | 11/2006 | Ramachandran | 235/493 |
| 7,321,460 B2 * | 1/2008 | Hiraoka et al. | 359/296 |
| 7,357,333 B2 * | 4/2008 | Gilfix | 235/494 |
| 7,449,212 B2 * | 11/2008 | Schneider | 427/7 |
| 2002/0167500 A1 * | 11/2002 | Gelbman | 345/204 |
| 2002/0171081 A1 | 11/2002 | Vincent et al. | |
| 2003/0164611 A1 | 9/2003 | Schneider et al. | |
| 2003/0169574 A1 | 9/2003 | Maruyama et al. | |
| 2005/0161501 A1 * | 7/2005 | Giering et al. | 235/379 |
| 2005/0248147 A1 * | 11/2005 | Staub et al. | 283/72 |
| 2006/0020469 A1 * | 1/2006 | Rast | 704/270 |
| 2006/0097059 A1 * | 5/2006 | Miyazaki | 235/492 |
| 2007/0229263 A1 * | 10/2007 | Staub et al. | 340/572.1 |
| 2008/0087721 A1 * | 4/2008 | Van Breemen et al. | 235/380 |
| 2008/0259416 A1 * | 10/2008 | Peters et al. | 359/2 |

FOREIGN PATENT DOCUMENTS

| | | |
|---|---|---|
| DE | 10163266 | 7/2003 |
| DE | 10214369 A1 | 7/2003 |
| DE | 10214370 A1 | 7/2003 |
| DE | 10214371 | 7/2003 |
| DE | 10200043 A1 | 11/2003 |
| DE | 69914944 T2 | 7/2004 |
| EP | 0741370 A1 | 11/1996 |
| EP | 1134694 | 9/2001 |
| EP | 1134694 A1 | 9/2001 |
| EP | 1182054 A2 | 2/2002 |
| EP | 1431062 | 6/2004 |
| JP | 63-024678 | 2/1988 |
| JP | 09-503711 | 4/1997 |
| JP | 11-296636 | 10/1999 |
| JP | 2003-288573 | 10/2003 |
| JP | 2004-133468 | 4/2004 |
| WO | WO 90/13148 A1 | 11/1990 |
| WO | WO9013148 | 11/1990 |
| WO | WO 99/54842 A1 | 10/1999 |
| WO | WO 0036560 A1 * | 6/2000 |
| WO | WO 00/39391 A1 | 7/2000 |
| WO | WO 03/035279 A1 | 5/2003 |
| WO | WO 03/054807 A2 | 7/2003 |
| WO | WO 03/054808 A2 | 7/2003 |
| WO | WO03057502 A | 7/2003 |
| WO | WO 03089250 A2 * | 10/2003 |
| WO | WO 2004011272 A2 * | 2/2004 |
| WO | WO2004056583 | 7/2004 |
| WO | WO 2006002770 A1 * | 1/2006 |
| WO | WO 2006061171 A2 * | 6/2006 |

OTHER PUBLICATIONS

Notice of Opposition issued on Jul. 29, 2010 for European Patent Application No. EP05784993.7.

Notice of Opposition issued on Aug. 6, 2010 for European Patent Application No. EP05784993.7.

Japanese Office Action issued in Japanese Patent Application No. 2007-531673 on Sep. 6, 2011.

* cited by examiner

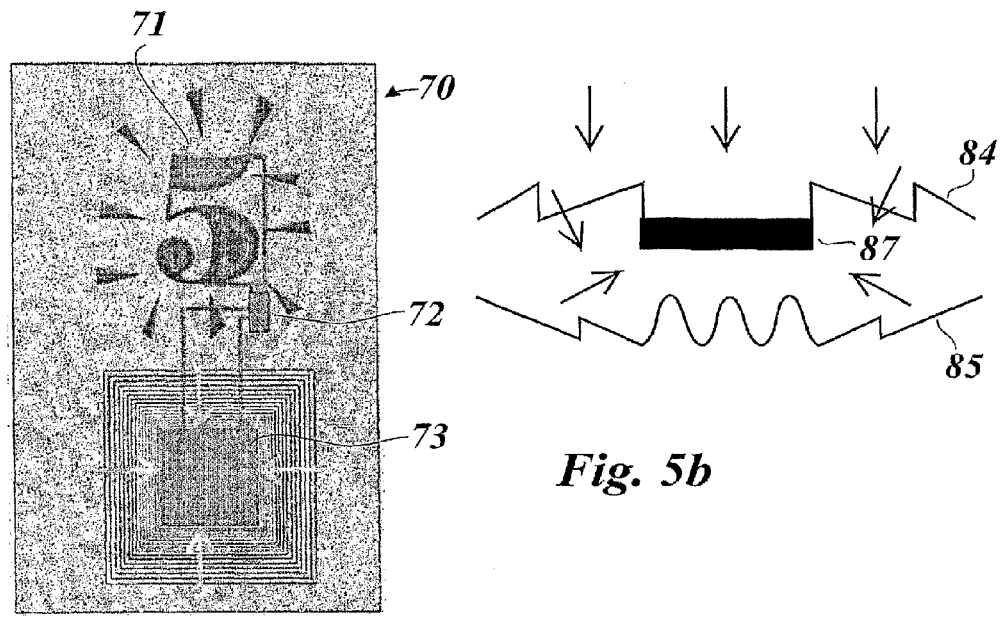
Fig. 5a
Fig. 5b
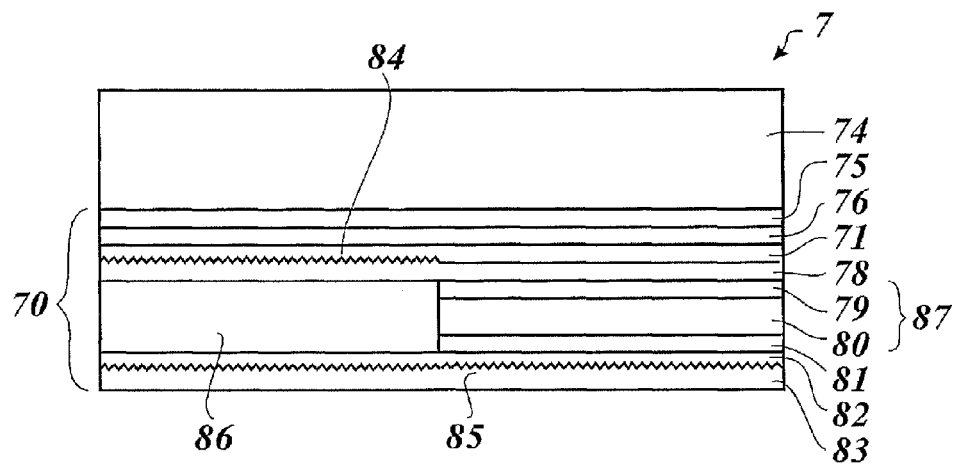
Fig. 5c

SECURITY DOCUMENT WITH ELECTRICALLY-CONTROLLED DISPLAY ELEMENT

This application claims priority based on an international Application filed under the Patent Cooperation Treaty Application No, PCT/DE2005/009920, filed on Sep. 15, 2005 and German Application No. 102004045211.3-55, filed on Sep. 17, 2004, which are both incorporated herein by reference.

BACKGROUND OF THE INVENTION

The invention relates to a security document, in particular a banknote or an identity card, which has a carrier and a multi-layer flexible film body which is applied to the carrier and which provides one or more optical security features.

In regard to the possible options afforded by modern colour copiers and other reproduction systems, there is a need for security documents to be provided with security features which on the one hand make it more difficult to produce a forgery using apparatuses of that kind and which on the other hand are easily and clearly recognisable for a lay person.

For that purpose it is known for security elements in the form of security threads to be incorporated into value-bearing documents, the arrangement being such that the thread is exposed region-wise at the surface and thus the optical security elements which are incorporated into the thread, for example holograms or partial demetallisations, can be checked by the person viewing same.

It is further known from EP 1 134 694 A1 for an electronic circuit to be printed on a sheet or strip of paper, the circuit comprising organic semiconductor material and being connected to a metal strip of a banknote by way of a conductor path. In that case the electronic circuit is not based on electronic components made up from usual semiconductor materials, but on organic field effect transistors using polymer semiconductor technology. In that case the metal strip serves as an antenna by way of which communication is possible between the semiconductor circuit and a corresponding evaluation circuit. In that way the electronic circuit can serve to detect forgeries while in addition it is made possible to detect the location of the document.

SUMMARY OF THE INVENTION

Now the object of the invention is to provide an improved security document.

That object is attained by a security document comprising a carrier and a multi-layer film body applied to the carrier, wherein the multi-layer film body has an electrically controlled display element for generating an optical security feature with associated electrical current source for operation of the display element in combination with a optically active diffractive structure.

That object is further attained by a transfer film for applying a multi-layer flexible film body which provides one or more optical security features to a carrier of a security document, wherein the transfer film has a carrier film and a transfer layer arrangement forming the multi-layer film body and the multi-layer film body has an electrically controlled display element for generating an optical security feature with associated electrical current source for operation of the display element in combination with an optically active diffractive structure.

An optically variable element, an electrically controlled display element and a current source are integrated into a preferably flexible, multi-layer film body and then applied to the carrier which preferably comprises a paper material. In this case the optically variable element is integrated into the electrically functional structure of the multi-layer film body so that those elements provide for mutual security of themselves and thus forgery or imitation of the optical security features provided by the film body is reliably prevented. In that respect manipulation is prevented to a correspondingly greater degree, the more the optical effects generated by the electrically controlled element and the optical effects produced by the optically variable element respectively engage into each other.

In accordance with a preferred embodiment of the invention the electrically controlled display element and the diffractive structure overlap at least region-wise so that the optical appearance of the optical effect produced by the diffractive structure is at least partially influenced by the electrically controlled display element. Thus for example the optical appearance of the optical effect produced by the diffractive structure, for example a hologram, can be influenced by the electrically controlled display element. In that respect it is possible for the electrically controlled display element to be a light-emitting display element and for the diffractive structure to alter the radiation emission characteristics of that display element. In that way it is possible to achieve novel, striking and easily remembered optically variable effects which can be imitated only with difficulty using conventional technologies.

In addition it is possible for the electrically controlled display element to be further superposed by another optically active microstructure, for example a matt structure or a refractively acting microstructure, for example a microlens structure. In that respect microstructures are in particular structures whose lateral dimensions are in the 100 μm range or less.

In accordance with a further preferred embodiment of the invention it is proposed that the diffractive structure is arranged in at least region-wise overlap with the electrical current source. Due to the overlap and/or integration of the optically active diffractive structure into the electrical current source, they mutually form an integral unit and thus cannot be separated from each other and provide a particularly high degree of safeguard against manipulation.

The electrical current source is in that case preferably a solar cell. Using a solar cell makes it possible to provide striking optical security features by means of the electrically control display element without the interposition of further active electronic components. This means that security documents according to the invention can be particularly inexpensively produced.

It is however also possible instead of a solar cell to use for example a printed battery or an antenna structure for coupling in high-frequency electromagnetic radiation as the current source. Thus for example items of information can be checked off by means of a mobile radio device.

Preferably the (diffractive) microstructure feeds light from a surface region surrounding the solar cell to the solar cell or increases the local efficiency of the solar cell. In that way on the one hand the radiation energy fed to the solar cell is increased and the optical appearance of the solar cell and the region surrounding the solar cell is superposed with an optically variable decorative effect. In that case the (diffractive) microstructure can be arranged over and/or under the active medium of the solar cell in order to increase the efficiency of the solar cell. If an antireflection structure, for example a motheye structure, is arranged over the solar cell, then 4% Fresnel reflection can be eliminated and thus the efficiency of the solar cell can be increased. If an optically active cross grating, for example a sinusoidal cross grating with 860 lines/ mm is arranged beneath the solar cell, then the efficiency of the solar cell can be further improved by coupling a part of the light transmitted through the active medium of the solar cell into the active medium of the solar cell. Furthermore it is also possible in that way that the user can alter the optical effect generated by the electrically controlled display element, by covering one or more of the feeding regions. In addition it is possible thereby that the solar cell can be optically covered over in wide regions and thus can be 'concealed' from the viewer and nonetheless sufficient amounts of radiation energy can still be fed to the solar cell. Preferably in that respect the diffractive structure has both the function of concentrating radiation energy on the solar cell and at the same time the function of providing an optically variable security element for the viewer in the region of the solar cell.

Particular advantages can further be achieved by the solar cell not being designed in a conventional technical/functional form, for example rectangular, but in the form of a pattern or an image which is inserted into the 'design' of the security element. Thus besides the purely electrically functional function of converting radiation energy into electrical energy, the solar cell further involves the function of an optical security element which for example shows specific image information to the viewer. In addition it is possible for the solar cell to be partially overprinted in pattern form and thus to serve as a background region of an optical security feature of the security document.

In accordance with a further preferred embodiment of the invention the diffractive structure is arranged adjacent to the electrically controlled display element so that the optical effects generated by the electrical display element and the optical effects generated by the diffractive structure provide mutually supplemental items of information. In that way any alteration to or manipulation of the one element or the other is immediately apparent to the viewer, whereby the level of safeguard against forgery is further improved.

The display element has for example an organic light emitting diode which is shaped in the form of a pattern or a number. The display element thus provides a structure emitting light of a given wavelength in the form of a pattern or a number. In addition it is possible for the display element to have an electrochromic element which is shaped in the form of a pattern or a number. The display element thus provides a structure which shows a pattern or a number in different colours in dependence on the applied electrical voltage. It is also possible for the display element to have a plurality of differently coloured and differently charged particles arranged movably between two electrode layers. By the application of a voltage between the electrode layers, the concentration of the one particles or the others can be altered in the proximity of the one electrode layer or the other so that the optical impression of the display element changes in dependence on the applied voltage or in dependence on pole reversal of the voltage.

It is also possible for the display element to be individualised. Thus the display element can be individualised for example in the form of a serial number, an image or a name, for example by means of suitably shaped overprinting, by laser ablation or by local transfer of layers by means of a transfer film.

Particular advantages can be achieved if the security document has a transparent window and the display element is arranged in that transparent window. It is however possible that the display element and the diffractive structure in superposed relationship with the display element are visible both from the front side and also from the rear side of the security document and otherwise can also have security features which can be recognised only when viewed in a transillumination mode. It is particularly advantageous here to use an electrically controlled display element whose viewing impression differs in respect of the front side and the rear side.

In accordance with a further preferred embodiment of the invention the flexible multi-layer film body also has an electronic circuit which is made up of organic semiconductor components and which controls the display element. The electronic circuit has for example an oscillator circuit which controls flashing of the display element or further effects such as for example a 'running light' effect. Preferably in that case the electronic circuit is superposed at least region-wise by an optically active diffractive structure which provides an optical security feature. That affords the advantages which have already been indicated hereinbefore.

In this respect the electronic circuit can be rendered visible or invisible for the viewer by the use of suitable materials. Furthermore for example metallic electrode layers can be generated in the same process operation as optically active metallically reflecting layers.

The layer structure of the flexible multi-layer film body is distinguished by a replication lacquer layer with a shaped, optical-diffraction active relief structure for producing a security feature having an optical-diffraction effect and two or more electrical functional layers of an electrically controlled display element. Preferably in this case the multi-layer film body has at least one electrical functional layer comprising an organic semiconductor material. The multi-layer film body preferably comprises the transfer layer arrangement of a transfer film, for example a hot stamping film, which is applied to the carrier of the security document, the carrier preferably comprising a paper material.

A further increase in the level of safeguard against forgery is achieved if the flexible multi-layer film body which includes the electrically controlled display element and an adjacent region of the security document are provided after application with a common, substantially opaque overprint in pattern form, and thus the boundaries of the applied multi-layer film body are optically resolved from the point of view of the viewer.

In addition besides optically variable elements which have an optical-diffraction effect the flexible multi-layer film body also has further optically variable elements generating optical effects of a different kind. For example the film body has a thin film layer system for producing viewing angle-dependent colour changes, an oriented and crosslinked liquid crystal layer for producing polarisation effects or cholesteric liquid crystal layers for producing viewing angle-dependent colour shift effects. Optically variable elements of that kind are preferably also superposed with the electrical components of the multi-layer film body or integrated thereinto.

BRIEF DESCRIPTION OF THE DRAWINGS

The invention is described by way of example hereinafter by means of a number of embodiments with reference to the accompanying drawings.

FIG. 8b shows a portion of the rear side of the security document according to the invention as shown in FIG. 8a.

DETAILED DESCRIPTION OF THE INVENTION

Figure 1:
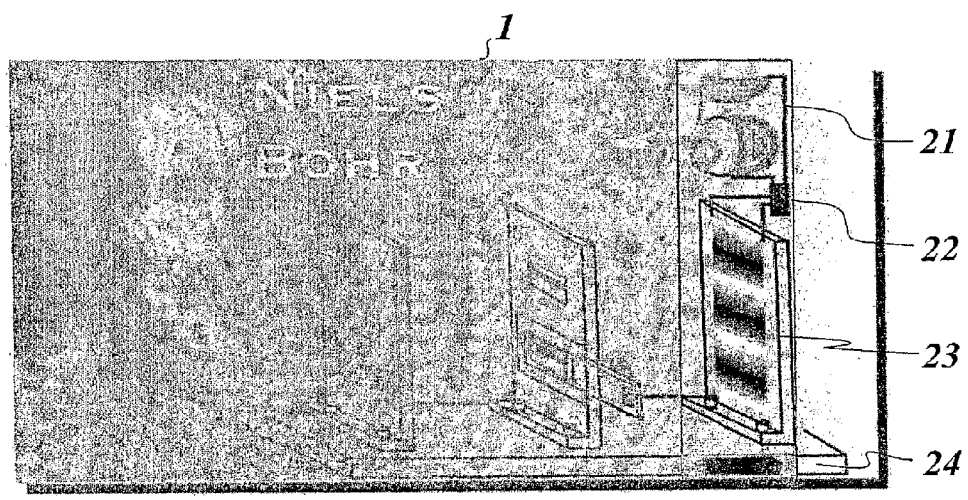
FIG. 1 shows a diagrammatic view of a security document according to the invention.
Figure 2:
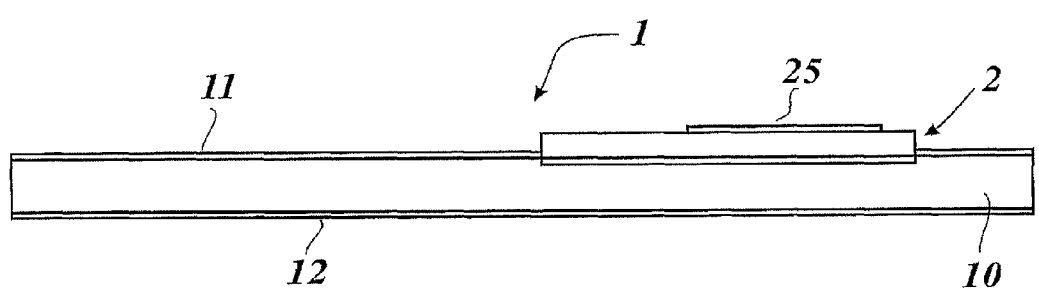
FIG. 2 shows a simplified sectional view which is not true to scale of the security document of FIG. 1.

FIGS. 1 and 2 show a security document 1 in the form of a banknote. The security document 1 comprises a carrier of a paper material which is approximately of a thickness of 100 µm. The carrier 10 is printed upon on both sides with coloured prints 11 and 12, for example using offset printing. It would also be possible to dispense with such printing or the carrier 10 could be printed upon with the prints 11 and 12 only after application of the film body 2. That print is shown by way of example in FIG. 1, with the numbers '1' and '2' being of a green colour here. A flexible film body 2 is further applied to the printed carrier 10 by a transfer process. It is further possible, prior to application of the film body 2, for the carrier 10 to be provided with a lacquer layer or a primer layer in the region to which the film body 2 is to be applied. By way of example the film body 2 is applied to the region of the security document 12 indicated in FIG. 1, by a hot stamping process. The film body 2 is then overprinted in region-wise manner with a print 25, for example by means of intaglio printing.

It is further possible for the security document 1 to be an identification document or a pass. In that case the carrier 10 comprises for example a mechanically stable plastic film or a plastic laminate, for example of polycarbonate. Furthermore, in such situations of use, one or more further plastic layers which act for example as a protective layer can also be applied to the film body 2 and optionally over the printing 25. Thus in such situations of use the film body 2 can be surrounded on both sides by further film layers which act as protective layers and increase the service life. By way of example in such an example of use the film body 2 can be laminated between two polycarbonate carrier layers.

The flexible film body 2 has a display element 21, an electronic circuit 22 electrically connected to the display element, a solar cell 23 and an optically variable element 24.

The optically variable element 24 is a diffractive security element, for example a hologram or Kinegram®. It is however also possible for the optically variable element 24 of a thin film layer system integrated into the film body 2 or crosslinked and oriented layer to comprise its (cholesteric) liquid crystal material. It is further also possible for still further optically variable elements to be integrated into the film body 2, which are preferably integrated into the film body 2 in the region of the solar cell 23, the electronic circuit 22 and the display element 21.

In addition it is possible for the security document 1 also to have further optical security features. Thus it is possible for example for a security thread or watermark to be introduced into the carrier 10 or for the printing 11, the printing 12 or the film body 2 to be provided with a print thereon comprising an effect pigment, for example a liquid crystal pigment or an interference layer pigment.

The detailed structure of the film body will now be described more fully with reference to FIGS. 3 to 5c.

Figure 3:
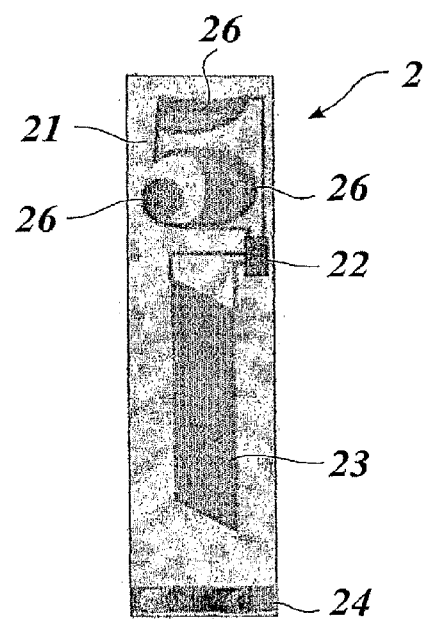
FIG. 3 shows a view of a multi-layer flexible film body for the security document of FIG. 1.

FIG. 3 shows a plan view of the flexible multi-layer film body 2 with the display element 21 which is shaped in the form of the number 5, the electronic circuit 22, the solar cell 23 and the optically variable element 24. As shown in FIG. 3 the film body is opaque in the region of the display element 21, the solar cell 23, the electronic circuit 22, the electrical connections leading from the electronic circuit 22 to the display element 21 and to the solar cell 23 and in the region of the optically variable element 24 and it is transparent in the remaining region so that in the remaining region the graphic configuration of the print 11 remains visible to the viewer. The print 25 is printed on to the film body 2 in the region of the solar cell 23 so that the optical appearance of the solar cell 23 is altered by the print 25, as shown in FIG. 1. It is also possible to dispense with the print 25.

The film body 2 forms the transfer layer arrangement of a transfer film 3 of which a portion is shown in FIG. 4 and which comprises a carrier film 31, a release layer 32 and the film body 2.

The carrier film 31 comprises a PET film of a thickness of 10 µm to 100 µm which is preferably mono-axially or bi-axially stretched in order to minimise distortion of the carrier film in the course of the further production process. The release layer 32 is then applied to the carrier film 31, the release layer 32 preferably comprising a wax-like material. A lacquer layer 33 of a thickness of 0.5 µm to 5 µm, preferably 1 µm to 2 µm, is then applied by means of a printing process. In that case the lacquer layer 33 is a transparent protective lacquer layer. A replication lacquer layer 34 is then applied to the layer 33. The replication lacquer layer 34 comprises a thermoplastic or crosslinked polymer in which a diffractive structure 24 is replicated by means of a replication tool under the effect of heat and pressure in the region 26 and in the region of the optically variable element 24. For that purpose for example a thermoplastic replication lacquer is applied over the full surface area involved to the protective lacquer layer 33 by means of an intaglio printing screen roller, dried and then the diffractive structure 42 is embossed into the above-identified region by means of a stamping die.

It is also possible for a radiation-crosslinkable lacquer to be applied to the protective lacquer layer 33, to constitute the replication lacquer, and for the diffractive structure 42 then to be shaped into the replication lacquer layer by means of UV replication.

Then, in the region of the electrically controlled display element 21 an optical separation layer 35 is applied to the replication lacquer layer 34. In that case the optical separation layer 35 can be a lacquer layer with a refractive index which is markedly different in relation to the replication lacquer layer 34. Preferably however the optical separation layer 35 is an HRI or LRI layer (HRI=high refraction index; LRI=low refraction index) of a suitable dielectric, for example $IiO_2$ or ZnS (for HRI) or $MgF_2$ (for LRI).

The electrode layer 36 is then applied to the film body and structured. In that case the electrode layer 36 is structured in the region of the display element 21 in the form of the digit '5' shown in FIG. 3 and there comprises a transparent, electrically conductive material, for example indium-tin oxide or an electrically conductive polymer, preferably polyaniline or polypyrrole. It is however also possible for the electrode layer 36 to be produced from a very thin and thus at least partially transparent metal layer, for example of gold or silver.

In that case the electrode layer 36 is applied when already structured to the optical separation layer 35 by means of a printing process, for example if the electrode layer 36 comprises an electrically conductive polymer. In addition it is possible for the electrode layer 36 to be applied over the full surface area to the film body disposed therebeneath and then removed region-wise again by means of positive/negative etching or laser ablation so that the electrode layer 36 is of the form shown in FIG. 3 in the region of the display element 21. Preferably the structured electrode layer 36 in that case not only affords the function of an electrode for the display element 21 but also has the necessary structuring in order at the same time to form an electrode layer of the electronic circuit 22 and the solar cell 23 and to produce the electrical conducting paths between the corresponding electrode layers of the display element 21, the electronic circuit 22 and the solar cell 23.

In that respect the optical separation layer 35 in the region of the display element 21 can also be omitted if the refractive index between the electrode material and the replication lacquer is appropriately high or a thin partially transparent metal layer is used as the electrode layer.

The layers 37 and 38 are then applied on the electrode layer 36 in the region of the display element 21. The electrode layer 39 is then applied which, as described with reference to the electrode layer 36, is structured in the region of the display element 21 in the form of the item of information to be represented, that is to say in the form of the digit '5' shown in FIG. 3. In this case the electrode layer 39 comprises a thin reflective metal layer, for example of copper, silver, aluminium or gold. The two electrode layers 36 and 39 and the two semiconductor layers 37 and 38 form an organic light emitting diode (OLED=organic light emitting diode), the electrode layer 36 forming the anode of the light emitting diode and the electrode layer 39 forming the cathode. In this case the semiconductor layers 38 and 39 are preferably applied by means of a printing process. In addition it is also possible for only one layer of an electroluminescent polymer, for example PPV or POLY (9,9'-dioctylfluorene) to be applied in a thickness of about 150 nm between the anode and the cathode. More detailed information regarding the structure of organic light emitting diodes and the materials which can be used for same can be found for example from WO 90/13148.

In parallel with the application of the layers 38 to 40 in the region of the display element 21, application of further electrically functional layers is effected in the region of the electronic circuit 22 and the solar circuit 23, those further layers implementing the corresponding function of the solar cell 23 and the electronic circuit 22.

In this case the solar cell 23 is preferably embodied in the form of an organic solar layer cell. Such a solar cell in the simplest case comprises a layer of a conjugate polymer, for example PPV-poly(para-phenylene-vinylene) arranged between a transparent electrode layer, for example the electrode layer 36, and a metallic electrode layer, for example the electrode layer 39. The thickness of the organic semiconductor layer in this respect is usually between 10 and some 100 nm. It is further possible to arrange one or more layers in the region of the solar cell 23 between the electrodes, comprising donor molecules and acceptor molecules. Those donors and acceptors are matched to the light spectrum of the sun whereby the effectiveness of the solar cell can be increased. Polymers, pigments and inks are used as donors and acceptors which in that way improve the energy absorption spectrum of the solar cell with respect to the above-described single-layer arrangement of a semiconducting polymer. Such a solar cell comprises for example a single pigment layer, a layer of a donor and a layer of an acceptor (pigment/pigment or polymer/polymer) or a mixture of donors and acceptors (pigment/pigment; polymer/polymer or polymer/ink).

In addition it is also possible, instead of the above-described organic solar cells which can be particularly well integrated into the film body 2 by virtue of the materials used for them, to use thin film silicon solar cells or DSSC solar cell (DSSC=dye sensitized solar cells).

In the region of the electronic circuit 22, a plurality of further structured layers comprising organic insulating materials, for example polyvinyl phenol, organic semiconductors, for example polythiophene and/or metallic or organic electrode materials such as for example polyaniline, polypyrrole or doped polyethylene, preferably of a thickness of 0.5 µm to 1 pm, are applied to the structured electrode layer 36. In that case those materials can be applied in liquid form, in dissolved form or in the form of a suspension and then solidified by drying or in some other fashion. Structuring of those layers causes the formation in the region of the electronic circuit 22 of one or more electronic components, for example organic field effect transistors, resistors and capacitors which afford the desired mode of operation, for example the mode of operation of an oscillator.

In the region of the optically variable element 24 a reflection layer is applied to the diffractive relief structure which is replicated into the layer 34 in that region. The reflection layer is preferably a thin metal layer, for example the electrode layer 39. It is however also possible for the optical separation layer 35 also to be applied in the region of the optically variable element 24 and thus to provide a semi-transparent, optically variable element 24.

Subsequently a protective lacquer layer 40 and an adhesive layer 41 are applied to the film body which is produced in that way and which is made up of a plurality of different structured layers. The adhesive layer 41 is preferably a layer comprising a thermally activatable or radiation-crosslinkable adhesive.

It is further possible for the replication lacquer layer 34 with the diffractive structure to be arranged not above but below the electrical functional layer of the display element 21. That will now be made clear by reference to FIG. 4b.

Figure 4A:
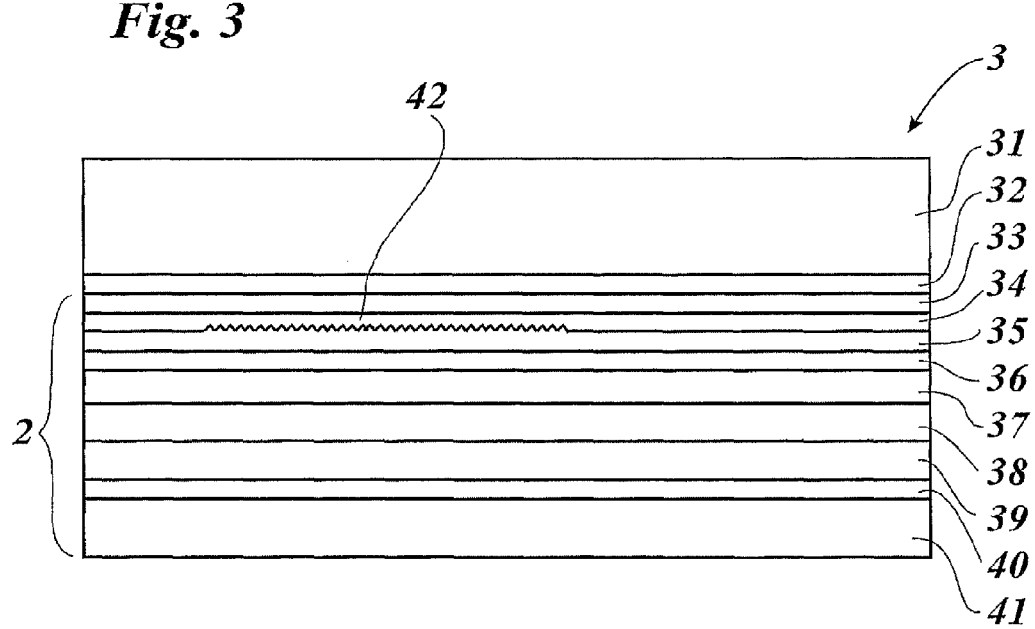
FIG. 4a shows a sectional view of the film body of FIG. 3, FIGS. 4b to 5c show diagrammatic views which are not true to scale of variants of the film body of FIG. 3, FIGS. 6a and 6b show views of the security document of FIG. 1 in various lighting situations.
Figure 4B:
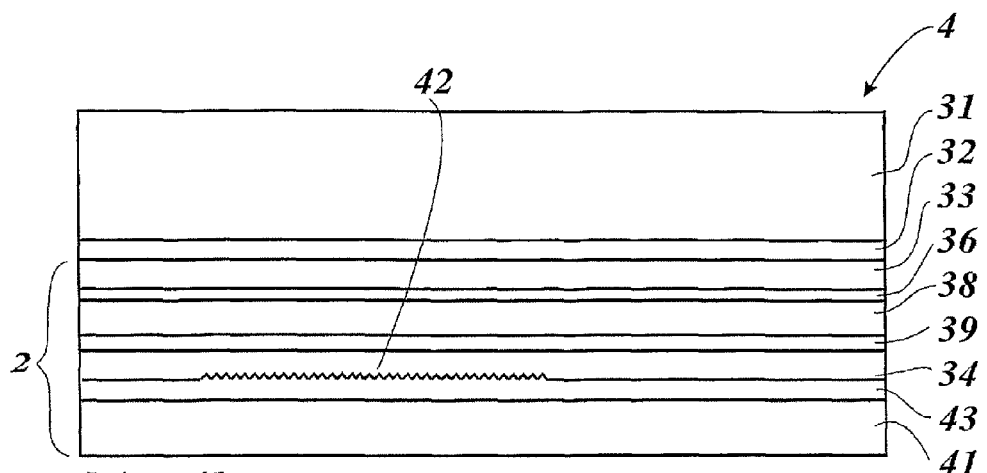

FIG. 4b shows a transfer film 4 with the carrier film 31, the release layer 32, the protective lacquer layer 33, the transparent electrode layer 36, the electroluminescent polymer layer 38 and the electrode layer 39. In this case the electroluminescent polymer layer can also comprise a layer system with two or more layers or a mixture of a plurality of materials. The electrode layer 39 here is not a structured reflective metal layer but a layer comprising a transparent conductive material, for example indium-tin oxide or a material layer in grating form which thus appears transparent. The replication lacquer layer 34 is then applied to the transparent electrode layer 39 and the diffractive structure 42 is shaped in the replication lacquer layer 34. A reflective layer 43, preferably a reflective metal layer or a reflection-enhancing layer, for example the layer 35 of FIG. 4, is then applied to the layer 34. It is possible in that way that the display element 21, insofar as it is arranged in a transparent window shaped in the carrier 10, can emit light both in the direction of the front side of the security document and also in the direction of the rear side thereof.

The adhesive layer 41 shown in FIG. 4a is then applied.

The embodiment of FIG. 4b also provides that both the diffractive structure provided in the region 26 of the display element 21 and also the diffractive structure provided in the region of the optically variable element 24 is shaped in the replication lacquer layer 34 so that the replication lacquer layer 34 covers preferably over the full surface area involved the electrical functional layers, disposed thereover, of the display element 21, the electronic circuit 22 and the solar cell 23 and protects them from manipulation.

The diffractive structure which is shaped in the region 26 of the display element is preferably a structure which generates a diffraction pattern, for example a hologram or a Kinegram.

If energy is fed to the organic light emitting diode forming the display element 21 then the hologram/Kinegram® lights up in the colour determined by the composition of the electroluminescent polymers of the layer 38 or the layers 38 and 39 respectively. In that respect, with the embodiment shown in FIG. 4a, by adjusting a low difference in refractive index between the layers 34 and 35, it is possible to provide that the hologram/Kinegram® becomes visible only when energy is fed to the organic light emitting diode forming the display element 21.

In addition it is also possible to shape in the region 26 of the display element 21 a structure which has an optical-diffraction effect and which specifically and targetedly influences the radiation emission characteristics of the light emitted by the organic light emitting diode. Thus it is possible to provide in the region 26 a blaze grating which deflects the light emitted by the organic light emitting diode in a given direction. Thus it is possible for the display element to appear very light when it is viewed from the normal viewing direction and for it to light only weakly when the security document is turned through 180°. In that respect refractive and diffractive elements can be combined together in the region 26 of the display element 21 in order to achieve the desired radiation emission characteristics.

Furthermore it is also possible for the embodiments of FIGS. 4a and 4b to be combined together and to provide in the film body 2 both a replication lacquer layer with a shaped diffractive structure, over the electrical functional layers, and also such a replication lacquer layer with shaped diffractive structure, under the electrical functional layer. That further enhances the level of protection from manipulation. In addition that also affords the possibility of producing interesting effects, in particular when viewing in a transillumination mode. Thus it is possible for the display element to show different optical appearances when arranged in the region of a transparent window in the carrier 10 in the direction of the front side of the security document 1 and the rear side of the security document 1 due to the differing configuration of the respective diffractive structures which are towards the viewer.

Furthermore it is also possible for two mutually superposed organic light emitting diodes to be provided in the film body 2 in the region of such a transparent window of the carrier 10, of which the one light emitting diode emits light in the direction of the front side of the security document and the other emits light in the direction of the rear side thereof. In that way under electrical control it is possible to achieve a different viewing impression in the direction of the front side of the security document and in the direction of the rear side.

Furthermore it is also possible to arrange two or more mutually juxtaposed, separately actuable organic light emitting diodes in the region of the display element 26 in order in that way to generate further optical effects. Thus it is possible for example for separately actuated organic light emitting diodes to be arranged in the form of a flag or the number '100' so that the flag and the number '100' emit light in three different colours.

Besides using an organic light emitting diode as the display element 21 it is also possible to provide an electrochromic element as the display element. Such an electrochromic element changes its colour as soon as a voltage is applied. The structure of the display element 21 and the use of an electrochromic element are described hereinafter by way of example with reference to FIG. 4c.

Figure 4C:
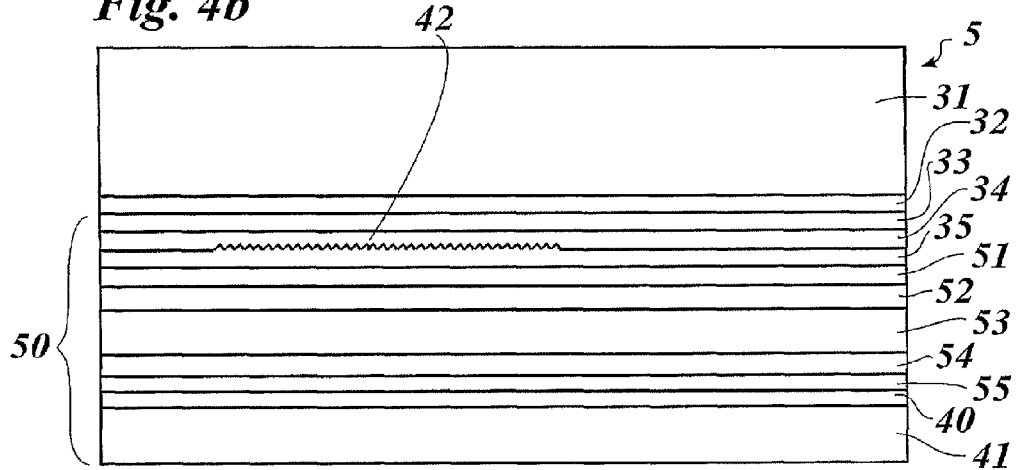

FIG. 4c shows a transfer film 5 comprising the carrier film 31, the release layer 32 and the transfer layer arrangement 50. The transfer layer arrangement 50 has the protective lacquer layer 33, the replication lacquer layer 34 with the diffractive structure 42 shaped therein, the optical separation layer 35, the protective layer 40 (optional) and the adhesive layer 41 as shown in FIG. 4a. Between the optical separation layer 35 and the protective lacquer layer 40, in the region of the display element 21, layers 51 to 55 are applied in mutually superposed relationship structured in the form shown in FIG. 3, forming an electrochromic element. The layers 51 and 55 are transparent, electrically conductive electrode layers for which by way of example the materials described in relation to the electrode layer 36 shown in FIG. 4a are used. The central layer 53 comprises a polymer electrolyte or aqueous metal oxide. The layers 52 and 54 adjoining the layer 53 comprise an electrochemical layer or an ion-storing layer. The electrochromic polymer used can be for example poly(3, 4-ethylene dioxide thiophene), PEDOT with poly(styrene sulphonate) PSS, by which it is possible to implement a colour change from a transparent state to a dark-blue state. A nanocrystalline titanium oxide layer for example can be used as the ion-storing layer.

Figure 4D:
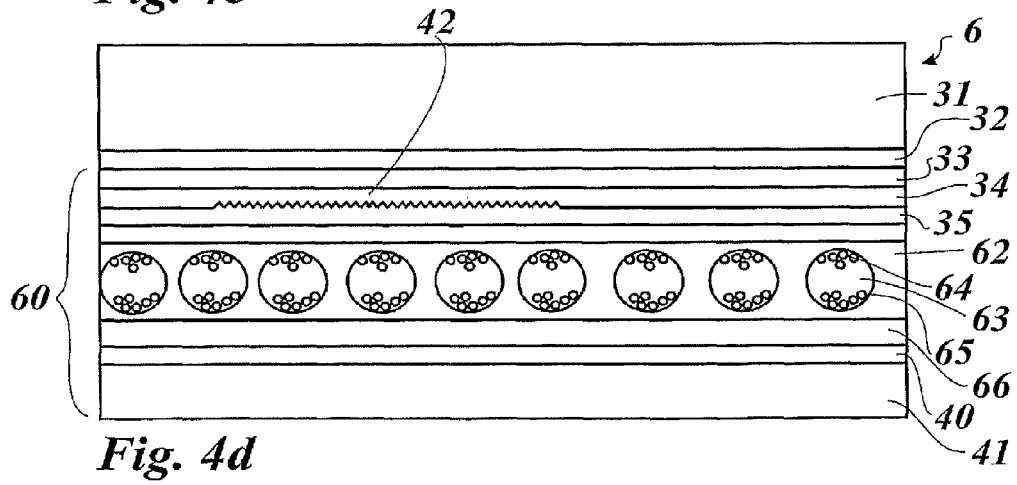

In addition it is possible for the display element 21 to be selected to be in the form of a layer structure in which differently coloured and differently charged particles are arranged movably between two electrode layers, whereby the concentration of the one particles or the others can be altered in the direction of the one electrode or in the direction of the other electrode by the application of a voltage to the electrode pair. An embodiment showing the use of a display element of that kind for the display element 21 is shown in FIG. 4d:

FIG. 4d shows a transfer film 6 with the carrier film 31, the release layer 32 and the transfer layer arrangement 60. The transfer layer arrangement 60 has the protective lacquer layer 33, the replication lacquer layer 34 with the shaped diffractive structure 42, the optical separation layer 35, the protective lacquer layer 40 and the adhesive layer 41 as shown in FIG. 4a. Provided between the layers 35 and 40 in the region of the display element 21 are structured electrode layers 61 and 66 in the form shown in FIG. 3 as well as an interposed layer 62 with microcapsules 63 which respectively contain black-coloured, positively charged particles 64 and white-coloured, negatively charged particles 65. The electrode layers 61 and 66 comprise a transparent, conductive material, for example one of the materials described in relation to the electrode layer 36 of FIG. 4a. The microcapsules 63 are preferably of a diameter of less than 100 μm. They are each filled with a clear fluid in which the positively and negatively charged particles 64 and 65 can freely move. Depending on the respective charge of the electrodes 61 and 66 therefore the top side of the microcapsule appears white and the underside black or vice-versa.

In addition it is advantageous to embody the support structures which provide for spacing of the layers 61 and 66 from each other by means of the replication lacquer layer 34 which then in the region of the support structures is of a thickness in the region of the diameter of the microcapsules (for example 80 μm). Preferably a relief profile of that kind is introduced into the replication lacquer layer 34 by means of UV replication.

Instead of the use of microcapsules it is also possible here to provide microspheres below the resolution capability of the human eye, by microstructuring of the layer 62. The positively and negatively charged particles 64 and 65 already described hereinbefore are respectively provided in the microspheres. In that respect it is also possible for those particles not to be coloured in black and white but for example coloured in two contrasting colours so that a changing coloured impression is produced depending on the respective voltage applied.

In addition it is also possible to use a display element based on liquid crystals for the display element 21. Preferably here a bistable reflective cholesteric LC material is used which, when using a black background, exhibits a colour change between a black state and a coloured state. As displays of that kind do not need a polariser, preferably structured ITO layers are used as the electrode layers. In order to control the thickness of the layer, for example 15 µm, a structured spacer layer is applied between the two electrode layers, in which the cholesteric LC material is then introduced. The cholesteric material can in that case comprise for example 60% proportion by weight of E7, 10% of CE2 and 20% of CB15 from Merck which is then mixed with a UV-crosslinkable monomer, for example NOA65 from Norland in a ratio of 85:15.

In addition it is also possible for the design variations described with reference to FIG. 4b to be applied to the embodiments of FIGS. 4c and 4d as well as the arrangement of a liquid crystal-based display element in the film body 2.

Furthermore it is also possible for the diffractive structure 42 as shown in FIG. 4a or FIG. 4b to be arranged in the region of the solar cell 23. On the one hand it is possible in that way for the optical appearance of the film body to be influenced in the region of the solar cell 23 for example by superpositioning of a hologram. Furthermore it is also possible in that way to influence the feed of light to the solar cell 23 and the efficiency of the solar cell 23.

Thus it is possible for example for a matt structure to be shaped into the replication lacquer layer 34, as shown in FIG. 4b, in the region of the solar cell 23, thereby to improve the efficiency of the solar cell in that region. In that case that functional structure can be part of the design of an optically variable element, the matt structure can for example form the background region of an optically variable element which presents a filigree guilloche pattern: the filigree lines of the guilloche pattern occupy only a small part of the surface area of the solar cell 23 and thus scarcely influence the energy efficiency of the solar cell 23. In that case the guilloche pattern is preferably embodied by means of overprinting on the film body 2.

Furthermore a suitable configuration in respect of the relief structure 42 affords the possibility, described hereinafter with reference to FIGS. 5a to 5c, of feeding light from the surface regions surrounding the solar cell, in the direction of the solar cell.

FIG. 5a shows a film body 70 with an electrically controlled display element 71, an electronic circuit 72 and a light-conducting region 73 with a solar cell.

The film body 70 forms the transfer layer arrangement of a transfer film 7 which is made up as shown in FIGS. 4a and 4b and which comprises a carrier film 74, a release layer 75 and the transfer layer arrangement forming the film body 70. In the region of the light-conducting region 73 with the solar cell the film body 70 has a protective lacquer layer 76, a replication lacquer layer 71 with a shaped relief structure 84, an optical separation layer 78, a second replication lacquer layer 82 with a shaped relief structure 85 and a second optical separation layer 83. Provided between the two relief structures 84 and 85 in the light-conducting region is a spacer layer 86 and provided in the central region is an organic solar cell element 87—already described in relation to FIG. 4a—comprising two structured electrode layers 79 and 81 and a photoactive layer 80 disposed therebetween.

In that respect the photoactive layer 80 can be a single layer or a multi-layer layer system.

If the optical spacer layer 86 comprises a material having a refractive index which is markedly different from that of the material of the replication lacquer layer 71 it is also possible to dispense with the optical separation layer 78. The optical separation layer 83 is preferably a reflecting layer, for example a full-area opaque metal layer.

As shown in FIGS. 5a and 5b, the light incident in the region surrounding the solar cell element 87 is guided by the relief structures 84 and 85 by virtue of the specific configuration shown in FIG. 5b of the relief structures 84 and 85 in the direction of the organic solar cell element 87 so that the radiation energy fed to that element is increased. With a suitable size of the feeding regions, it is also possible here for the solar cell element 87 to be printed upon over the full surface area with a pattern or to be covered over the full surface area by a reflecting optically variable element, for example a Kinegram®, which is disposed thereover. In addition it is also possible for the light-feeding relief structures 84 and/or 85 to be superposed with relief structures which generate a diffraction image. The resulting structures afford thus both the function of feeding light to the solar cell element 87 and also generate an optically variable effect which serves as a further security feature for the viewer.

It is also possible to dispense with one of the relief structures 84 or 85 and to embody the light feed or the increase in efficiency of the solar cell by means of only one relief structure. It is for example possible to provide only the relief structure 85 and for that to be in the form of a matt structure, a blaze or a cross grating.

In addition it is possible for the combination, described with reference to FIGS. 3 to 5c, of optically active diffractive structures and electrically functional layers to be embodied not just in the form of superpositioning of such layers but by such layers being arranged in mutually juxtaposed relationship in the manner of a mosaic and in that way closely interwoven with each other.

Figure 6A:
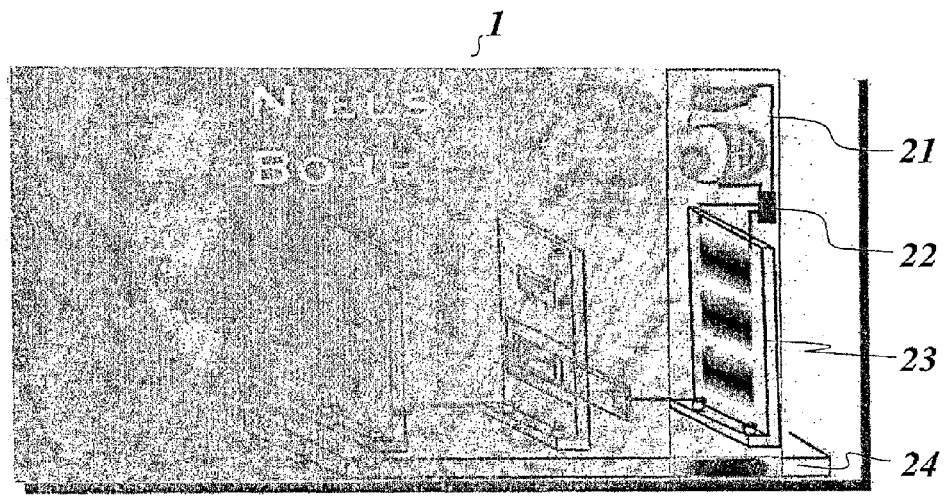

Reference will now be made to FIG. 6a to describe the viewing impression, afforded for the viewer, of the security document 1 with a low level of lighting and, with reference to FIG. 6b, with bright lighting:

FIG. 6a shows the security document 1 with the display element 21, the electronic circuit 22, the solar cell 23 which is overprinted in region-wise manner and the optically variable element 24. The digits '1' and '2' are printed in a green colour. The display element 21 which is shaped in the form of the digit '5' and which is implemented in the form of an organic light emitting diode lights up in a blue colour when it is not activated. In the regions 26 the optically variable element which is arranged in the region of the display element 21 as described hereinbefore is visible even in the non-activated state of the organic light emitting diode.

Figure 6B:
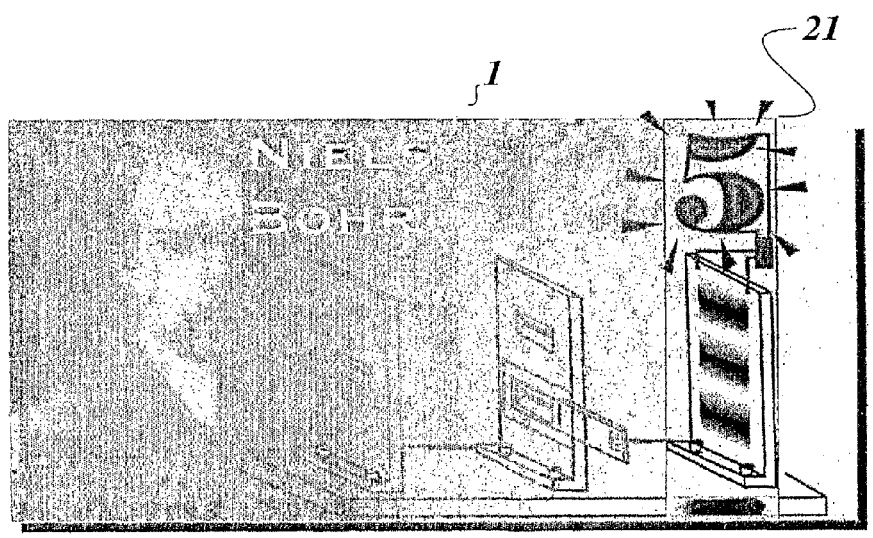

When the solar cell 23 is illuminated the organic light emitting diode is activated and emits red light so that the digit '5' lights up in red, as indicated in FIG. 6b. Here it is also possible for the electronic circuit 22 to actuate the organic light emitting diode in such a way that the digit '5' flashes. As already described hereinbefore however it is also possible to dispense with the electronic circuit 22 and to connect the solar cell 23 directly to the organic light emitting diode.

Figure 7A:
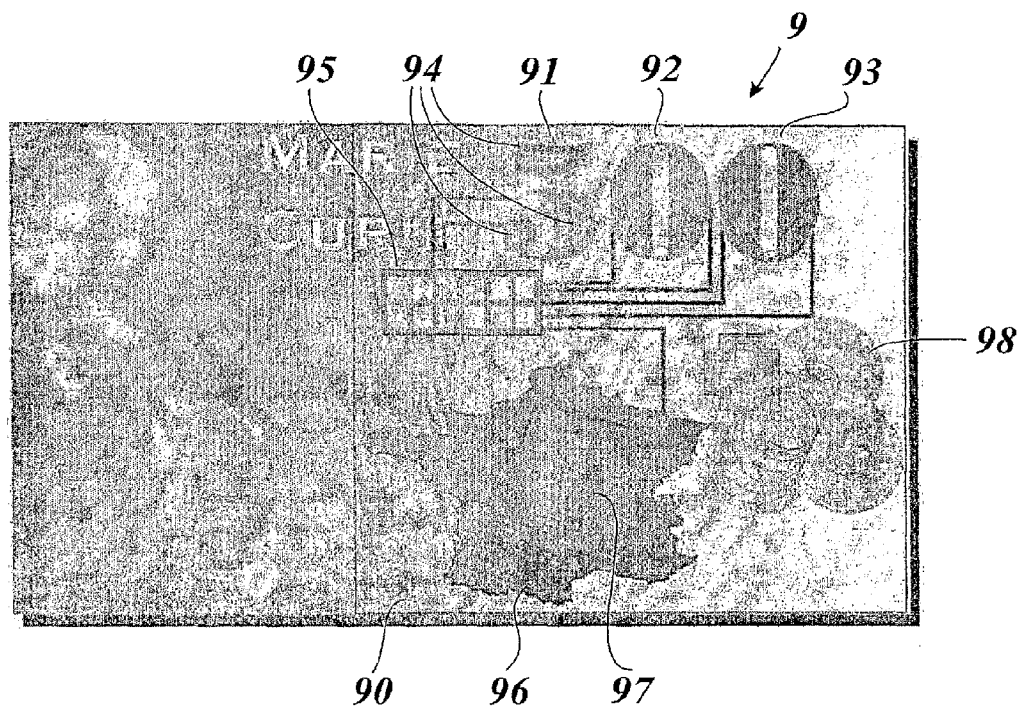
FIGS. 7a and 7b show views of a further security document according to the invention in various lighting situations.
Figure 7B:
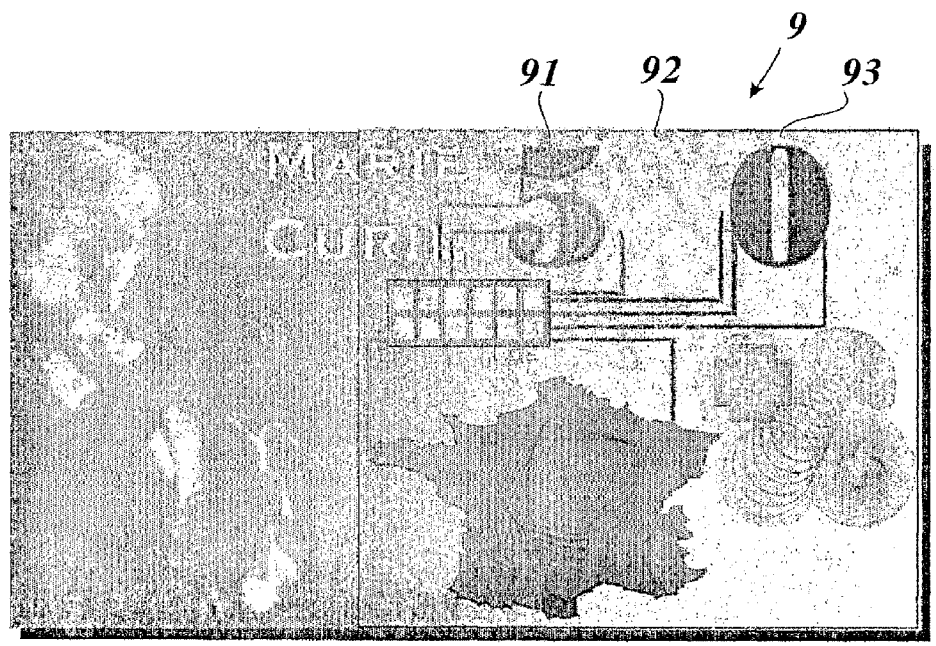

FIGS. 7a and 7b describe the optical appearance of a security document 9 which is also designed as shown in FIGS. 3 to 5c.

FIG. 7a shows the security document 9 which has a display element made up from three separately actuated electrochromic elements 91, 92 and 93, an electronic circuit 95, a solar cell 96 and an optically variable element 98. Those elements are integrated in a flexible film body 90 which, as described hereinbefore, is applied by means of a transfer film to the printed-upon carrier of the security document 9.

The solar cell is here shaped in the shape of the country of France and forms a design element of the security document 9. The solar cell 96 is further superposed with an optically variable element 97, a Kinegram®. In addition such a Kinegram® is arranged in regions 94 of the display element 91 and accordingly overlies both the display element 91 and also the solar cell 96.

With a low level of illumination the electrochromic elements 91, 92 and 93 are not activated and all appear in the same blue colour.

With bright illumination the electrochromic elements 91, 92 and 93 are activated and appear in different colours, as indicated in FIG. 7b.

In this respect it is also possible for one or more of the elements 91 to 93 not to be in the form of an electrochromic element but in the form of an organic light emitting diode so that for example the digit '5' flashes red with bright illumination.

Figure 8A:
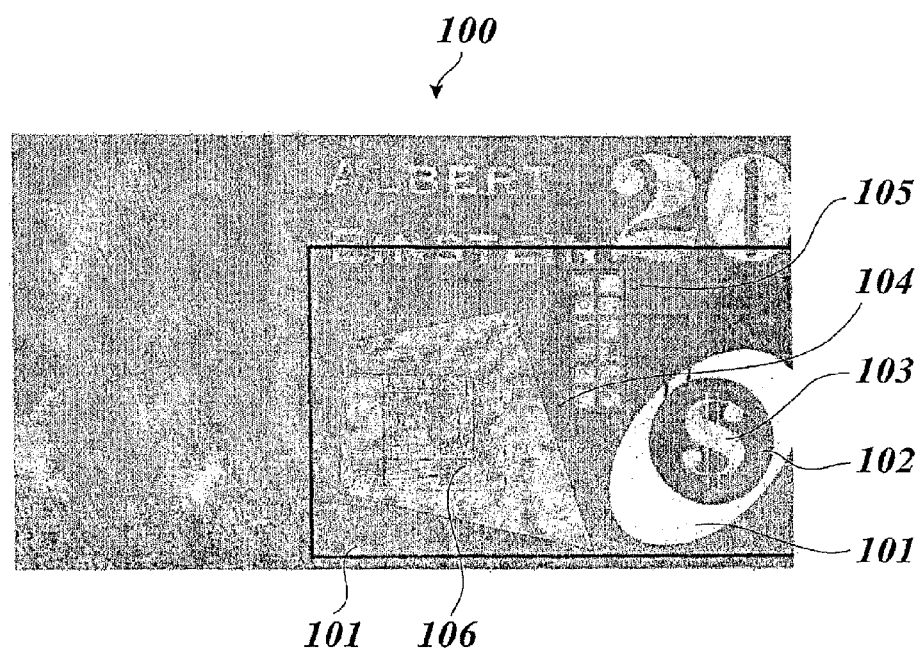
FIG. 8a shows a portion of the front side of a further security document according to the invention in accordance with a further embodiment of the invention.
Figure 8B:
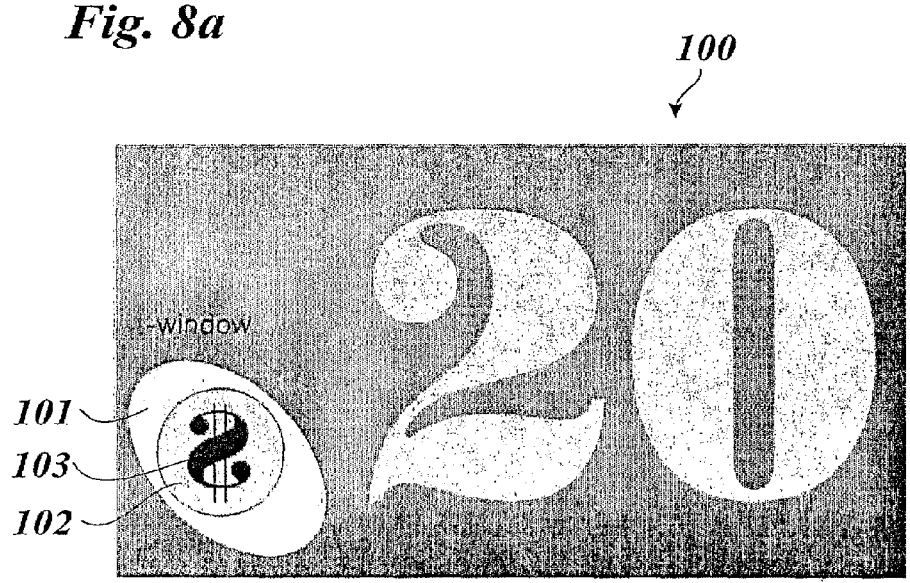

FIGS. 8a and 8b show the optical appearance of a security document 100, wherein FIG. 8a shows a portion of the front side of the security document 100 and FIG. 8b shows a portion of the rear side thereof.

As shown in FIG. 8a, applied to the carrier of the security document 100 is a multi-layer flexible film body 107 which has a solar cell 104, an electronic circuit 105 and a display element arranged in the region of a transparent window 101 which is stamped in an oval shape out of the carrier of the security document 100. In this case the display element is of a configuration as shown in FIG. 4d, wherein the electrode layers 61 and 66 each comprise two pairs of electrodes. The one pair of electrodes is shaped in the form of the symbol '$' and is provided in the one region 103 and the other pair of electrodes is shaped in the form of the surrounding region 102.

In this case also the solar cell 104 is superposed with an optically variable element 106, preferably a Kinegram®.

When now the security document 100 is illuminated, the pairs of electrodes of the display element involve an oppositely polarised voltage so that the viewing impression shown in FIG. 8a is afforded on the front side and the viewing impression shown in FIG. 8b is afforded on the rear side. The electronic circuit 105 changes the polarity of the two pairs of electrodes in regular periods so that the symbol '$' appears alternately in white against a dark background or dark against a white background.

What is claimed is:

1. A security document, comprising:
   a carrier; and
   a multi-layer flexible film body applied to the carrier, the multi-layer flexible film body including, apart from the carrier, an electrically controlled display element for generating an optical security feature, an electrical current source for operation of the display element and an optically active diffractive structure, wherein the display element has a plurality of differently coloured and differently charged particles which are arranged between two electrode layers, wherein at least one of the optically active diffractive structure and a microstructure is arranged in overlapping relationship with the electrically controlled display element, wherein an optical appearance of an optical effect produced by at least one of the optically active diffractive structure and the microstructure is controlled by the electrically controlled display element, the multi-layer flexible film body having a replication lacquer layer with the optically active diffractive structure shaped therein for producing an optical-diffraction feature, wherein the security document has an adhesive layer securing the multi-layer flexible film body to the carrier, the optically active diffractive structure being arranged at least region-wise substantially overlapping the entire electrical current source, and wherein the electrical current source is a solar cell, and wherein at least one of the two electrode layers affords the function of an electrode to the display element, an electronic circuit and the solar cell.

2. A security document according to claim 1, wherein at least one of the diffractive structure and a microstructure feeds light from a surface region surrounding the solar cell to the solar cell or increases the efficiency of the solar cell.

3. A security document according to claim 2, wherein the diffractive structure feeds light to the solar cell and further provides an optically recognisable security feature.

4. A security document according to claim 1, wherein the solar cell is shaped in the form of a pattern or image and surrounded by a print design of the carrier.

5. A security document according to claim 1, wherein the solar cell is partially overprinted in pattern form.

6. A security document according to claim 1, wherein the flexible multi-layer film body and an adjacent region of the security document are provided with a common, substantially opaque overprint in a pattern form.

7. A security document according to claim 6, wherein the overprint in a pattern form contains individualized information.

8. A security document according to claim 1, wherein the display element is partially overprinted in pattern form, wherein the overprinting contains individualised information.

9. A security document according to claim 1, wherein the display element is provided with individualised information by means of laser ablation.

10. A security document according to claim 1, wherein the security document has a transparent window and the display element is arranged in the transparent window.

11. A security document according to claim 10, wherein at least one of the two electrode layers comprising an organic semiconductor material.

12. A security document according to claim 10, wherein the display element is visible from two opposed sides of the security document through the transparent window.

13. A security document according to claim 12, wherein the two electrode layers comprise a transparent, conductive material, wherein the positively charged particles have a first colour and the negatively charged particles have a second colour being in contrast to each other.

14. A security document according to claim 1, wherein the diffractive structure is arranged at least region-wise over an electronic circuit which is made up of organic semiconductor elements and which controls the display element.

15. A security document according to claim 1, wherein the multi-layer film body has a battery or a capacitor for energy storage.

16. A security document according to claim 1, wherein the carrier comprises a paper material.

17. A security document according to claim 1, wherein the multi-layer film body is applied as a transfer layer arrangement of a transfer film to the carrier.

18. A security document according to claim 1, wherein an upper electrode layer of the two electrode layers includes a thin partially transparent metal layer.

19. A security document according to claim 1, wherein at least one of the two electrode layers is transparent and conductive.

20. A security document according to claim 1, wherein the security document has a transparent window and the display element is arranged in the transparent window, the multi-layer film body having a battery or a capacitor for energy storage.

* * * * *

UNITED STATES PATENT AND TRADEMARK OFFICE
CERTIFICATE OF CORRECTION

PATENT NO.        : 8,387,886 B2                                               Page 1 of 1
APPLICATION NO.   : 11/575240
DATED             : March 5, 2013
INVENTOR(S)       : Tompkin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1219 days.

Signed and Sealed this

First Day of September, 2015

Michelle K. Lee
*Director of the United States Patent and Trademark Office*